United States Patent [19]
Weston

[11] Patent Number: 4,962,978
[45] Date of Patent: Oct. 16, 1990

[54] HIGH EFFICIENCY SEAPLANE

[76] Inventor: Paul H. Weston, 4214 W. Lk. Sammamish Pkwy. NE. #306, Redmons, Wash. 98052

[21] Appl. No.: 343,503

[22] Filed: Apr. 26, 1989

Related U.S. Application Data

[63] Continuation-in-part of Ser. No. 168,427, Mar. 15, 1988, abandoned.

[51] Int. Cl.$^5$ .............................................. B64C 1/00
[52] U.S. Cl. .................................. 244/105; 244/106
[58] Field of Search ................. 244/105, 106, 13, 101, 244/36

[56] References Cited

U.S. PATENT DOCUMENTS

| | | | |
|---|---|---|---|
| 1,263,846 | 4/1918 | Brooke . | |
| 1,922,769 | 8/1933 | Kleinhenz | 244/2 |
| 2,228,860 | 1/1941 | Von Schlippe | 244/105 |
| 2,259,625 | 10/1941 | Dornier | 244/106 |
| 3,145,954 | 8/1964 | Jenny et al. | 244/105 |
| 3,599,903 | 8/1971 | Handler | 244/13 |
| 3,614,032 | 10/1971 | Purcell, Jr. | 244/36 |
| 3,627,235 | 12/1971 | Lippisch | 244/12 R |
| 4,298,175 | 11/1981 | Earl | 244/13 |

FOREIGN PATENT DOCUMENTS 1297632 11/1972 United Kingdom .

OTHER PUBLICATIONS

"Air Trails", Summer of 1970.
"A Chronical of Aviation History in America", Eaton Mfg. Co., Cleveland, OH., Copyright 1948, p. 197.

Primary Examiner—Sherman D. Basinger
Assistant Examiner—Stephen P. Avila
Attorney, Agent, or Firm—Delbert J. Barnard

[57] ABSTRACT

A seaplane having a low wing, a cabin over the wing, a pusher propeller located at the aft end of the cabin and just forward of the trailing edge of the wing and an empennage supported on a tail boom. The central portion of the leading edge of the wing extends forward in the shape of an isosceles triangle with its base against what would be a conventional leading edge and its apex in a vertical plane through the center line of the aircraft. The wing, including the triangular extension, provides flotation. The underside of the central portion incorporates transverse, angularly displaced and longitudinal steps. The lower portion of the propeller arc is separated from the water surface by the thickness of the wing near its trailing edge and the clearance between the arc and the proximate upper surace of the wing, allowing the thrust line and line of action of aerodynamic drag to be relatively close, resulting in a relatively low negative pitching moment. This moment is primarily offset by positive aerodynamic forces on the triangularly shaped wing extension producing a positive pitching moment. The extension diverts water spray from the propeller and creates vortices which direct high energy air into the propeller arc.

6 Claims, 4 Drawing Sheets

HIGH EFFICIENCY SEAPLANE

Related Application

This is a continuation-in-part of my copending application Ser. No. 07/168,427, filed Mar. 15, 1988 now abandoned.

Technical Field

The subject invention is in the field of aircraft intended for taking off from and landing on water. More specifically it is in the field of such craft in which the flotation required for operating from water is provided by the primary portions of the aircraft rather than by float structures attached to the aircraft. Still more specifically it is in the field of such craft in which a substantial portion of the flotation is provided by portions of the aircraft which provide hydrodynamic and aerodynamic lift during takeoff and landing and aerodynamic lift during flight.

Background Art

Various prior art seaplanes derived flotation from portions of the airplane which provided hydrodynamic and aerodynamic lift during takeoff and landing and aerodynamic lift during flight. U.S. Pat. No. 3,627,235 illustrates one example. Another is shown in FIG. 1 of British Patent No. 1,297,632. Other examples are found in the literature, including the Taylor Coot as shown on page 72 of the Summer 1970 issue of Air Trail's Homebuilt Aircraft and The International "Duckling" shown on page 197 of "A Chronicle of the Aviation History in America," prepared for private circulation by Eaton Manufacturing Co., Cleveland, Ohio, copyright 1948.

However, while some of the prior art aircraft achieved moderate commercial success, none have achieved long term success and this lack of long term success is directly attributable to the fact that these seaplanes were not competitive in terms of cost of ownership. As is well-known in the art, cost of ownership is heavily dependent on first cost of the aircraft and its operating performance, specifically in terms of cruising speed relative to horsepower. It is also well-known in the art that the efficiency of seaplanes is degraded by the need to keep the propeller(s) as clear of the water and spray as possible. Doing so results in having the thrust line of propulsion high and above the center of overall aerodynamic drag rather than having the two forces essentially in line during cruise performance.

Therefore it is an objective of the subject invention to provide a seaplane having high aerodynamic efficiency for a seaplane. A further objective is that the thrust line be as close as feasible to the line of action of aerodynamic drag while avoiding significant interference of water spray with propeller performance and durability and, further, providing optimum inflow of air to the propeller.

Additional objectives may become apparent from the following description of the invention with reference to the attached drawings.

Disclosure of the Invention

The subject seaplane is basically a low wing pusher type aircraft. That is, the wing is below the center of gravity of the aircraft and the propeller is positioned aft of the pilot/passenger enclosure (cabin) and pushes rather than pulls the aircraft. The vertical and horizontal tail surfaces are positioned aft of the propeller and supported by a boom structure extending from the central part of the trailing edge of the wing. The lower surface of the wing is the lowest part of the aircraft and flotation is provided by the wing, specifically the central portion because of the dihedral angle of the wing. A key feature of the invention is the planform of the wing. The central portion of the leading edge is triangular, in the form of an isosceles triangle, with the base of the triangle at what would be a conventional leading edge of the wing. The width of the base of the triangle is between $\frac{1}{4}$ and $\frac{1}{2}$ the wing span and the length (that is, the fore and aft dimension) between $\frac{1}{8}$ and $\frac{1}{2}$ the wing span. In other words, the apex angle is in the range of 30° to 50° and the length of the triangle is in the range of 1. to 4.0 the maximum wing chord. The lower surface of this triangular extension serves as a hydrodynamic planing surface during takeoff and landing operations. It curves generally upward and forward from the trailing edge of the wing and is stepped to reduce hydrodynamic drag. One or two steps may be used and they may be transverse steps, swept aft, or used in combination.

The triangular extension provides improved hydrodynamic longitudinal stability. Further, it serves to divert spray away from the propeller and generally to help shield it from any deleterious influences of the operation on water. Further, because of the upward, forward slope of its lower surface and the natural operation of the airplane at a positive angle of attack, it generates vortices which divert air over the top of the wing along the sides of the streamlined cabin positioned on the top of the wing center section and into the lower portion of the propeller arc, the engine and propeller being mounted at the aft end of the cabin. The lower portion of the propeller arc would otherwise tend to be deprived of sufficient inflow air, decreasing efficiency and producing undesired noise and vibration. With the arrangement as described the propeller arc is separated from the water surface only by the thickness of the wing portion beneath it and the clearance between the propeller and proximate portion of the upper wing surface. Therefore, the line of the thrust is as close to the line of action of the drag force as is practicable for a low wing seaplane.

The location of the thrust line above the line of action of the drag force introduces a nose down pitching moment which would normally be countered by a down load on the horizontal stabilizer. Such down loads are counterproductive and tend to reduce aerodynamic efficiency. However, the aerodynamic loads on the triangular portion of the wing act well ahead of the aircraft's center of gravity, tend to balance out the above mentioned nose-down pitching moment and are productive, not counterproductive.

The aircraft may be made amphibious. Small floats are blended into the wing tips to provide the necessary hydrodynamic stability in roll. The invention is described in more detail below in conjunction with the attached drawings.

Brief Description of the Drawings

In the drawings, like parts are like numbered throughout the drawings, and.

Figure 1:
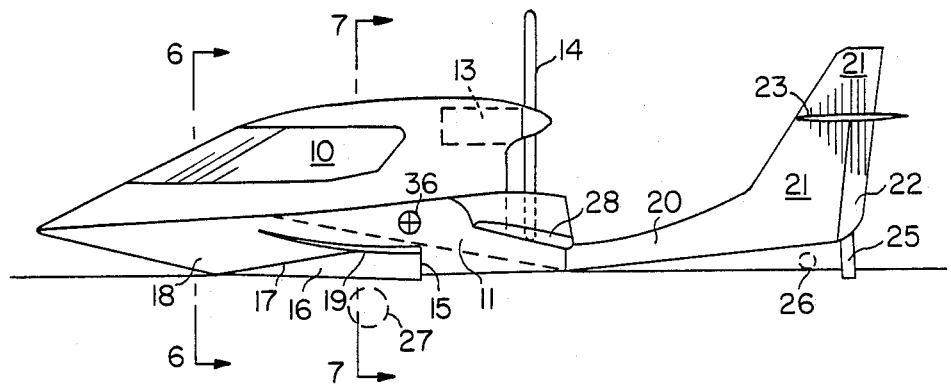
FIG. 1 is a side view of a preferred embodiment of the invention.

Best Mode for Carrying Out the Invention

In the seaplane shown in the drawings cabin 10 extends longitudinally and is generally above wing 11. Wing 11 has a central portion 12 triangularly shaped in planform, extending forwardly of the main wing portion. The laterally outward portions of the wing 11 are either tapered or constant chord in planform and contain ailerons 30 and 30', used for roll control, and flaps 31 and 31', used for increasing lift and drag. Planing surfaces 16 and 18 on the underside of the central wing portion slope forwardly and upwardly to leading edge 12 of the center area of wing 11 from laterally disposed step 15. In the preferred embodiment these planing surfaces are substantially flat and are separated by diagonally and vertically disposed step 17. Steps 15 and 17 are essentially transverse to center line 35 of the aircraft. The forward planing surfaces 18 slope upwardly at a greater angle than the rearward planing surfaces 16. The wing 11 and planing surfaces 16 and 18 slope laterally upwardly and outwardly from the longitudinal center line 35 of the airplane. Longitudinally and vertically disposed steps 19, essentially parallel to center line 35, separate the planing surfaces 16 and 18 from the underside surfaces 33 of the wing. The forwardly disposed planing surfaces 18 slope upwardly and outwardly from the longitudinal center line 35 at a greater angle than the rearward planing surfaces 16 and intersect the leading edge 12 of the wing 11 and steps 19. Ski floats 28 and 28' are attached to the underside of the outer portion of the wing to provide required hydrodynamic stability in roll.

Fuselage 10 contains the controls, payload, and engine 13 which drives the propeller 14. The engine and propeller are positioned such that the arc 34 described by the propeller tip is relatively close to the top surface 32 of the wing and the tail boom 20. The tail boom 20 extends from the wing rearwardly and supports the empennage which comprises vertical stabilizer 21, which in turn supports air rudder 22, retractable water rudder 25, retractable tail wheel 26, and horizontal stabilizer 23, which in turn supports elevator 24. A retractable main landing gear 27 is indicated by dashed lines.

Figure 2:
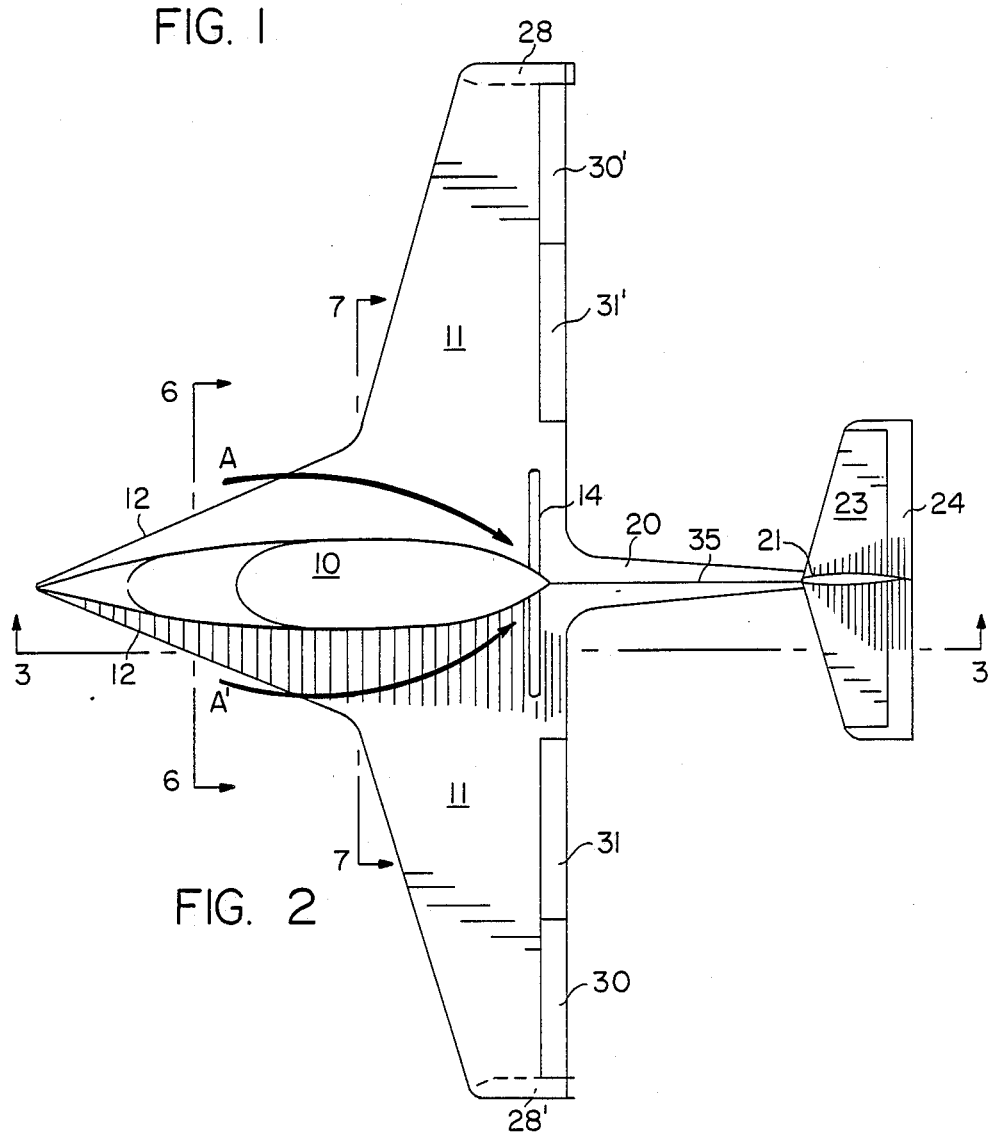
FIG. 2 is a top plan view of the embodiment.
Figure 3:
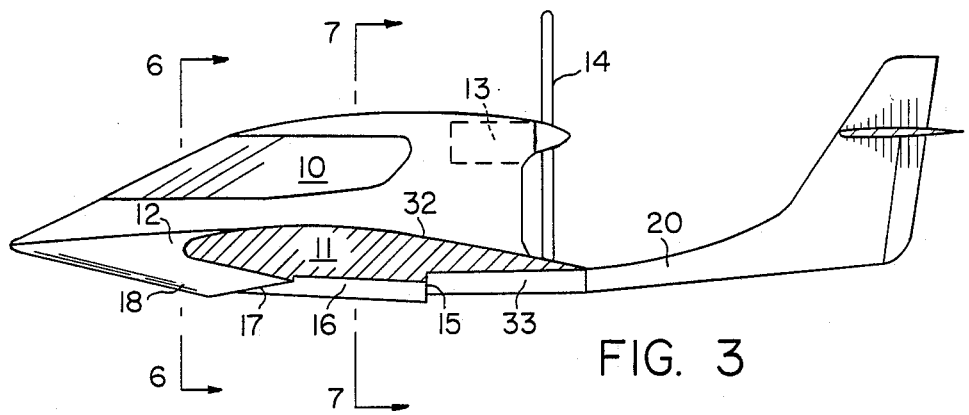
FIG. 3 is a sectional view taken at 3—3 in FIGS. 2, 4 and 5.
Figure 4:
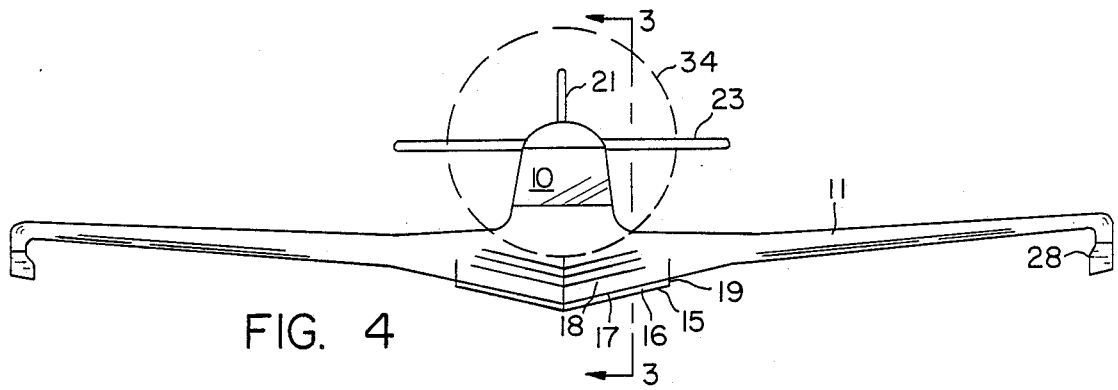
FIG. 4 is a front view of the embodiment.

FIG. 3 is a cross-sectional view of the embodiment taken at 3—3 in FIG. 2 and illustrates the wing cross-sectional shape in that plane. Arrows A and A' in FIG. 2 illustrate vortices generated by the triangularly shaped extension of the landing edge diverting high energy air into the propeller arc.

Figure 6:
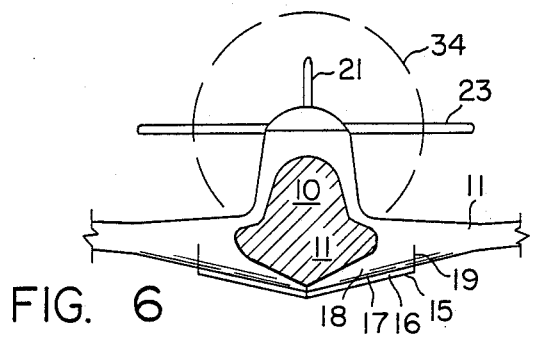
FIG. 6 is a sectional view taken at 6—6 in FIGS. 1-3 and 5.
Figure 5:
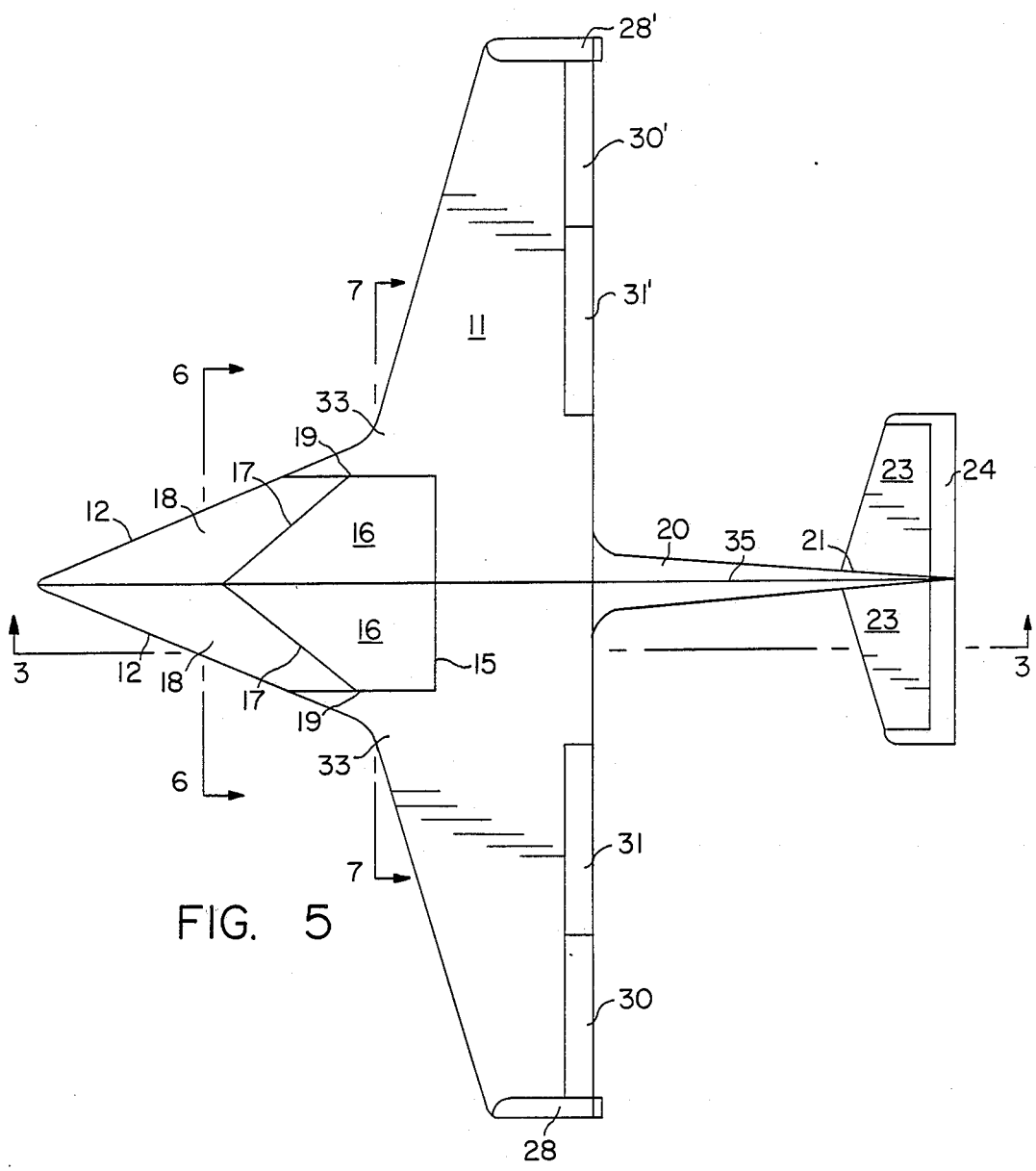
FIG. 5 is a bottom plan view of the embodiment.
Figure 7:
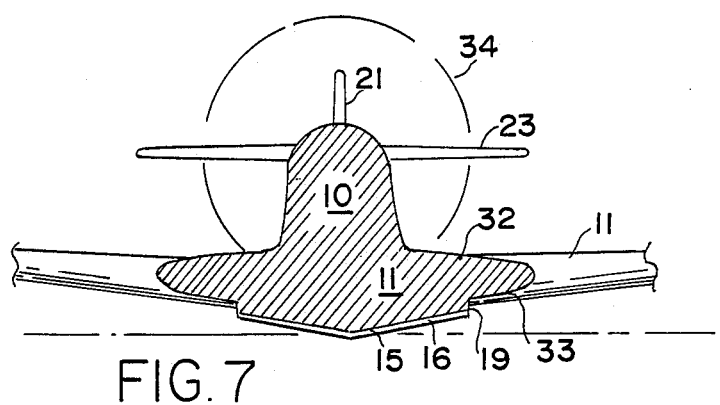
FIG. 7 is a sectional view taken at 7—7 in FIGS. 1-3 and 5.

FIGS. 6 and 7 are sectional views indicating the cross-sectional shapes of the aircraft at sections 5 and 6 as indicated in FIGS. 1, 2 and 3.

Figure 8:
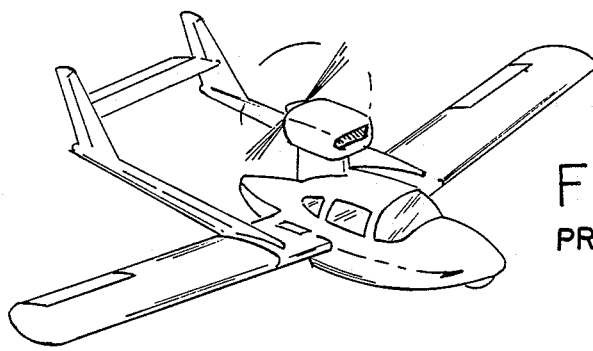
FIGS. 8 and 9 show prior art aircraft.
Figure 9:
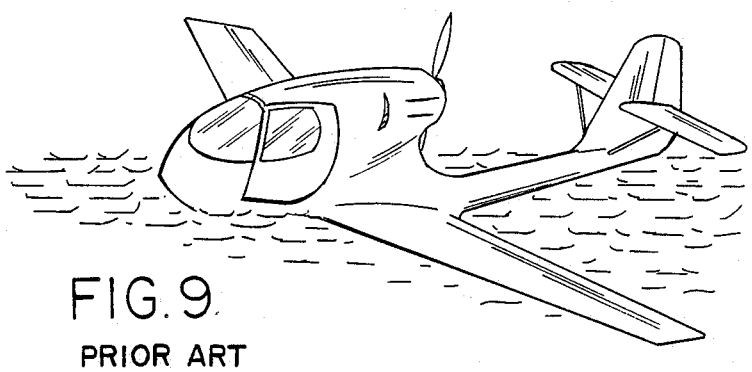

FIGS. 8 and 9 show prior art in which the wings provide some flotation and hydrodynamic actions. FIG. 8 illustrates the Taylor Coot and FIG. 9 the International "Duckling."

It will be understood from these descriptions that the subject invention meets its objectives. A seaplane of high aerodynamic efficiency is provided with its thrust line close to the line of action of aerodynamic drag. The configuration shields the propeller from water spray while providing it with an adequate supply of inflow air.

It will be further understood by those skilled in the art that while a preferred embodiment of the invention is disclosed other embodiments and modifications of the one described are possible within the scope of the invention which is limited only by the attached claims.

What is claimed is:

1. A seaplane having a longitudinal center line, a low wing, a pusher propeller, a tail boom and an empennage supported by said tail boom;

said wing having a span, a chord, a forwardly extending central portion, opposite side portions flanking said central portion, and a leading edge extending along said side portions and said central portion, said forwardly extending central portion in plan view being essentially in the shape of an isosceles triangle;

said central portion having a width in the range of ¼ to ½ of said span; and said central portion extending forwardly from the side portions.

2. The seaplane of claim 1, wherein the central portion extends forwardly of the side portions a distance in the range of 1 to 4 times said chord measurement where the side portions join the center portion.

3. The seaplane of claim 1 in which said wing has an underside which is the lowest part of the aircraft, said under surface having at least one step and one planing surface.

4. The seaplane of claim 3 in which said at least one step is transverse to said center line and said underside further comprises two steps essentially parallel to said center line.

5. The seaplane of claim 1 in which said wing has an underside which is the lowest part of the aircraft, said under surface having at least two planing surfaces and two steps positioned essentially transverse to said center line.

6. The seaplane of claim 5 in which said underside further comprises two steps positioned essentially parallel to said center line.

* * * * *